US008646270B2

(12) United States Patent
Takahashi et al.

(10) Patent No.: US 8,646,270 B2
(45) Date of Patent: Feb. 11, 2014

(54) ENGINE (75) Inventors: Takeshi Takahashi, Osaka (JP); Takao Kawabe, Osaka (JP); Hidenori Nomura, Osaka (JP); Tomoo Ogata, Osaka (JP); Kouji Shimizu, Osaka (JP); Satomi Ukai, Osaka (JP)

(73) Assignee: Yanmar Co., Ltd., Osaka (JP)

( * ) Notice: Subject to any disclaimer, the term of this patent is extended or adjusted under 35 U.S.C. 154(b) by 180 days.

(21) Appl. No.: 13/059,209

(22) PCT Filed: Jun. 11, 2009

(86) PCT No.: PCT/JP2009/060669
§ 371 (c)(1),
(2), (4) Date: Feb. 15, 2011

(87) PCT Pub. No.: WO2010/021190
PCT Pub. Date: Feb. 25, 2010

(65) Prior Publication Data
US 2011/0138806 A1    Jun. 16, 2011

(30) Foreign Application Priority Data
Aug. 19, 2008  (JP) ................................. 2008-210947

(51) Int. Cl.
*F02D 23/00* (2006.01)
*F02B 33/44* (2006.01)
*F02B 33/00* (2006.01)

(52) U.S. Cl.
USPC .................. 60/600; 60/602; 60/612; 123/562

(58) Field of Classification Search
USPC .................. 60/612, 600, 602, 605.1; 123/562
See application file for complete search history.

(56) References Cited

U.S. PATENT DOCUMENTS

| | | | | |
|---|---|---|---|---|
| 5,020,327 A | * | 6/1991 | Tashima et al. | 60/600 |
| 5,142,866 A | * | 9/1992 | Yanagihara et al. | 60/605.2 |
| 6,311,493 B1 | * | 11/2001 | Kurihara et al. | 60/600 |
| 2006/0123782 A1 | * | 6/2006 | Rosin et al. | 60/599 |
| 2007/0289302 A1 | * | 12/2007 | Funke et al. | 60/602 |
| 2009/0211247 A1 | * | 8/2009 | McEwan et al. | 60/602 |
| 2011/0192160 A1 | * | 8/2011 | Takahashi et al. | 60/600 |

FOREIGN PATENT DOCUMENTS

| | | | |
|---|---|---|---|
| EP | 2206904 | * | 7/2010 |
| JP | 09-184425 | | 7/1997 |

(Continued)

OTHER PUBLICATIONS

International Search Report for International Application No. PCT/JP2009/060669, Japanese Patent Office mailed Sep. 29, 2009, 2 pgs.

*Primary Examiner* — Thomas Denion
*Assistant Examiner* — Ngoc T Nguyen
(74) *Attorney, Agent, or Firm* — Sterne, Kessler, Goldstein & Fox P.L.L.C.

(57) ABSTRACT

Turbines and compressors, which constitute superchargers, are disposed in series on an exhaust gas passage and an air intake passage, respectively. The supercharger is equipped with a supercharger rotation sensor, which transmits a detection signal obtained according to the rotation of the compressor to a control device, a bypass passage, which bypasses exhaust gas from the upstream side to the downstream side of the turbine, and a bypass valve, which regulates the flow rate of exhaust gas flowing through the bypass passage. Control device regulates the rotational speed of the compressors in a high-efficiency range by producing a control signal based on the detection signal from the supercharger rotation sensor, and sending the control signal to the bypass valve.

4 Claims, 7 Drawing Sheets

(56) References Cited

FOREIGN PATENT DOCUMENTS

| JP | 2004-092646 | 3/2004 | |
| JP | 2006-057570 | | 3/2006 |
| JP | 2007-092683 | | 4/2007 |
| WO | WO2008015400 | * | 2/2008 |

* cited by examiner

ENGINE

BACKGROUND

1. Field of the Invention

The present invention relates to an engine having a plurality of superchargers.

2. Background Art

Conventionally, as an engine having a plurality of superchargers, an engine having a two-stage supercharging system is known. In the engine having the two-stage supercharging system, for example, turbines rotatively driven by receiving exhaust gas are arranged in one exhaust passage in series, and compressors pressurizing intake air are arranged in one intake passage in series. Bypass valves are provided in a bypass passage bypassing the exhaust gas from the upstream side to the downstream side of the turbines and a bypass passage bypassing the exhaust gas from the upstream side to the downstream side of the compressors, whereby the supercharging pressure can be limited by controlling the bypass valves (for example, see the Patent Literature 1).

However, conventionally, in the engine having the superchargers, only the control is performed in which the supercharging pressure is limited corresponding to the operating state of the engine based on detection signals from an intake air flow rate sensor and a supercharging pressure sensor. Therefore, in the engine having the two-stage supercharging system, it is difficult to secure the supercharging pressure corresponding to the operating state of the engine while limiting the rotational speed of each of the compressors constituting the superchargers to be within a high-efficiency range of the supercharger.

Patent Literature 1: the Japanese Patent Laid Open Gazette 2004-92646

BRIEF SUMMARY

Problems to Be Solved by the Invention

The purpose of the present invention is to provide an engine having a plurality of superchargers in which the supercharging pressure corresponding to the operating state of the engine can be secured and rotational speed of each of compressors constituting the superchargers can be limited to be within a high-efficiency range of the supercharger, and a control method thereof.

Means for Solving the Problems

Explanation will be given on means for solving the problems according to the present invention.

According to the first aspect of the present invention, an engine has a plurality of superchargers, each of the superchargers comprising a turbine rotatively driven by receiving exhaust gas flowing in an exhaust passage and a compressor rotatively driven by the turbine and pressurizing intake air flowing in an intake passage. The turbines constituting the superchargers are arranged in the one exhaust passage in series. The compressors constituting the superchargers are arranged in the one intake passage in series. At least one of the superchargers comprises a supercharger rotation sensor transmitting a detection signal obtained from rotation of the compressor constituting the supercharger to a control device, a bypass passage bypassing the exhaust gas from the upstream side to the downstream side of the turbine constituting the supercharger, and a bypass valve limiting the flow rate of the exhaust gas flowing in the bypass passage. The control device prepares a control signal based on the detection signal from the supercharger rotation sensor and transmits the control signal to the bypass valve so as to limit the rotational speed of each of the compressors constituting the superchargers to be within a high-efficiency range of the supercharger.

According to the second aspect of the present invention, in the engine of the first mode of the present invention, a fuel injection nozzle whose fuel injection characteristic can be changed by a control signal is provided, and the control device prepares a control signal based on the detection signal from the supercharger rotation sensor and transmits the control signal to the fuel injection nozzle so as to change the fuel injection characteristic corresponding to an operating state.

According to the third aspect of the present invention, in the engine of the first mode of the present invention, a supercharging pressure sensor detecting the pressure of the intake air pressurized by the plurality of the superchargers and transmitting a detection signal to the control device, and an intake throttle arranged at the upstream side of the supercharging pressure sensor and limiting the flow rate of the intake air pressurized by the plurality of the superchargers are provided, and the control device prepares a control signal based on the detection signals from the supercharging pressure sensor and the supercharger rotation sensor and transmits the control signal to the intake throttle so as to limit the pressure of the intake air corresponding to an operating state.

According to the fourth aspect of the present invention, in the engine of the third mode of the present invention, an exhaust gas recirculation (EGR) passage guiding a part of exhaust gas flowing in the exhaust gas passage to the intake passage, and an EGR valve limiting the flow rate of the exhaust gas flowing in the EGR passage are provided, and the control device prepares a control signal based on the detection signals from the supercharging pressure sensor and the supercharger rotation sensor and transmits the control signal to the EGR valve so as to limit the flow rate of the exhaust gas guided to the intake passage corresponding to the operating state.

Effect of the Invention

The present invention brings the following effects.

According to claim 1, by controlling the bypass valve based on the detection signal from the supercharger rotation sensor, the rotational speed of each of the compressors constituting the superchargers can be limited to be within the high-efficiency range of the supercharger. Accordingly, the intake air can be pressurized to the supercharging pressure corresponding to the operating state of the engine, whereby the fuel consumption can be reduced.

According to claim 2, by controlling the fuel injection nozzle based on the detection signal from the supercharger rotation sensor, the fuel injection characteristic can be optimized suitably. Accordingly, the fuel injection corresponding to the operating state of the engine can be realized, whereby the exhaust emission can be prevented from being worsened.

According to claim 3, by controlling the intake throttle based on the detection signals from the supercharging pressure sensor and the supercharger rotation sensor, it is not necessary to provide any bypass passage bypassing from the upstream side to the downstream side of the compressors constituting the superchargers. Accordingly, the construction of the engine can be simplified.

According to claim 4, by controlling the EGR valve based on the detection signals from the supercharging pressure sensor and the supercharger rotation sensor, the flow rate of the exhaust gas guided to the air intake passage can be optimized.

Accordingly, the fuel injection corresponding to the operating state of the engine can be realized, whereby the exhaust emission can be prevented from being worsened.

DETAILED DESCRIPTION

The Best Mode for Carrying out the Invention

Next, explanation will be given on the mode for carrying out the invention.

Figure 1:
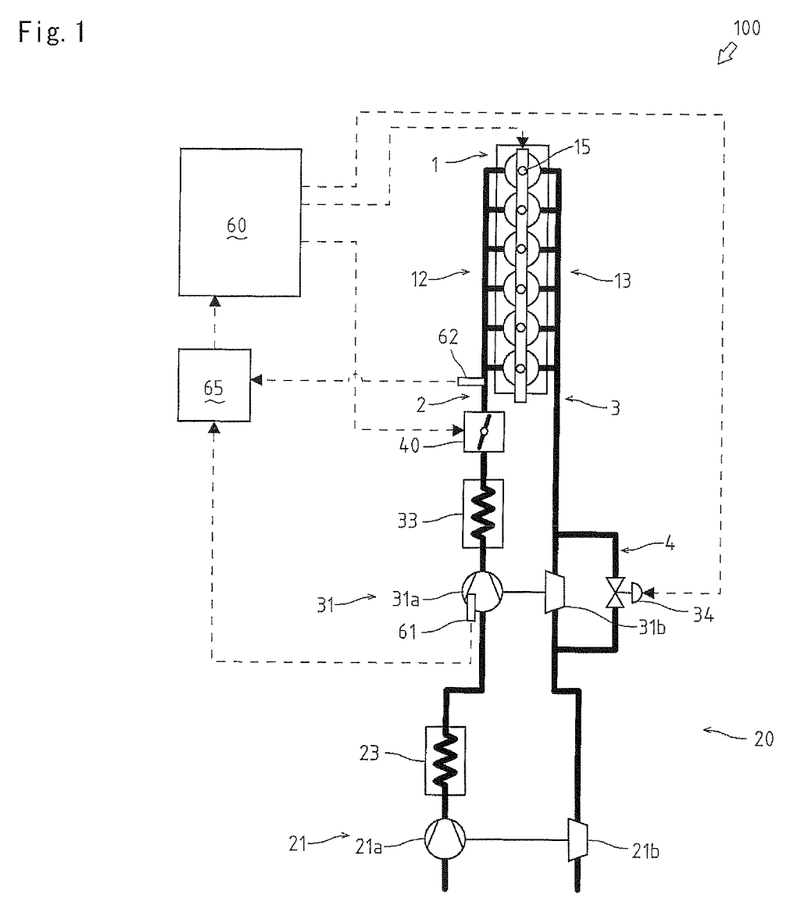
FIG. 1 is a schematic drawing of entire construction of an engine having a two-stage supercharging system according to a first embodiment of the present invention.
Figure 2:
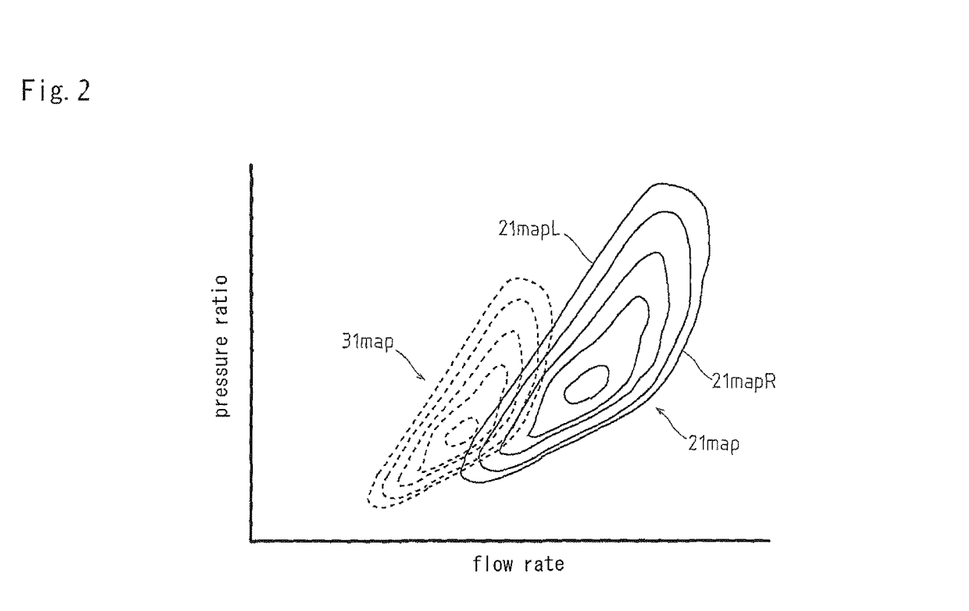
FIG. 2 is a graph of iso efficiency curves of compressor performance of superchargers.
Figure 3:
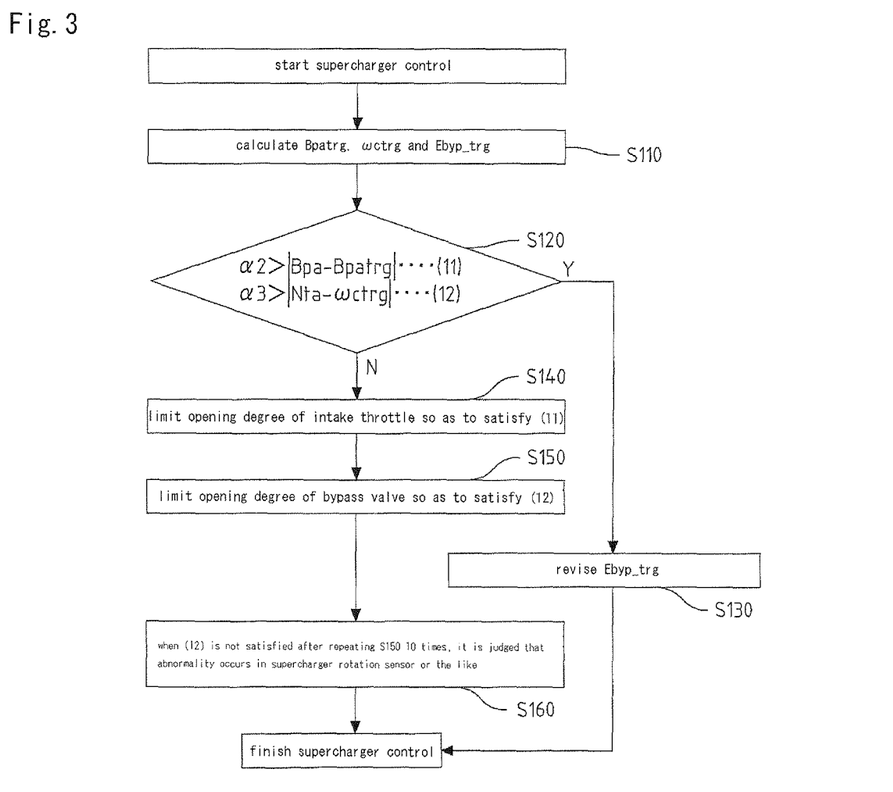
FIG. 3 is a flow chart of control construction of the superchargers.

FIG. 1 is a schematic drawing of entire construction of an engine 100 having a two-stage supercharging system 20 according to a first embodiment of the present invention. FIG. 2 is a graph of iso efficiency curves of compressor performance of superchargers 21 and 31. FIG. 3 is a flow chart of control construction of the superchargers 21 and 31.

Figure 4:
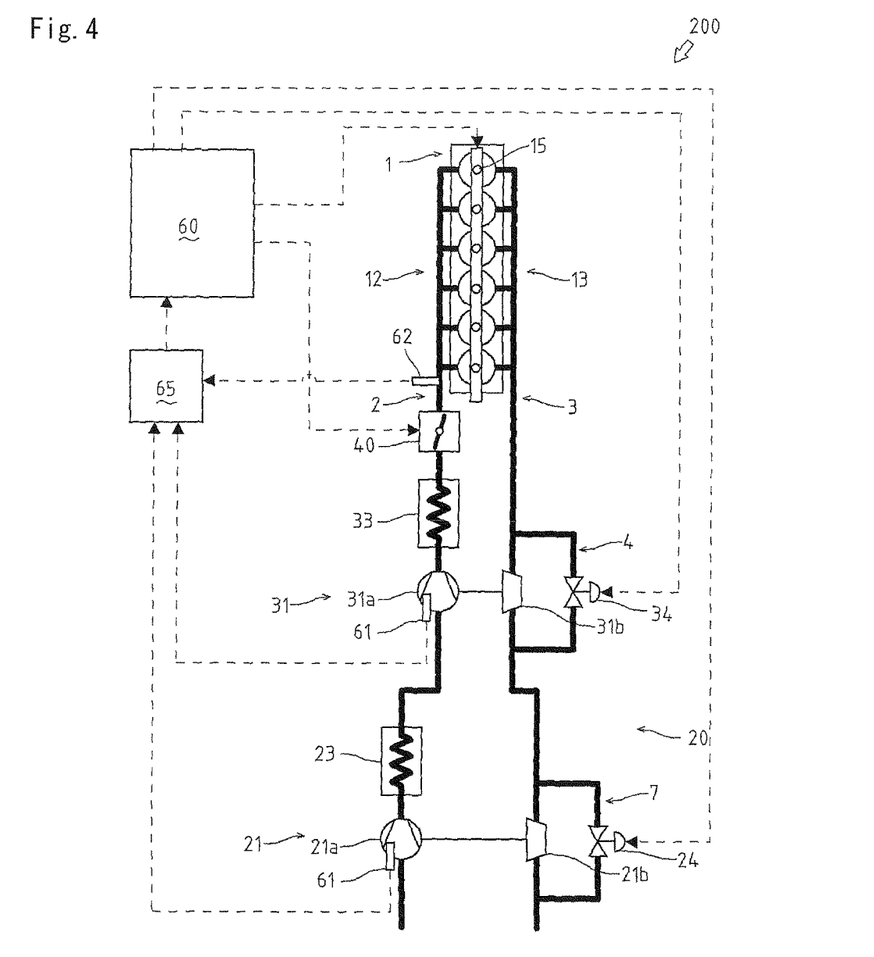
FIG. 4 is a schematic drawing of entire construction of an engine having the two-stage supercharging system according to a second embodiment of the present invention.
Figure 5:
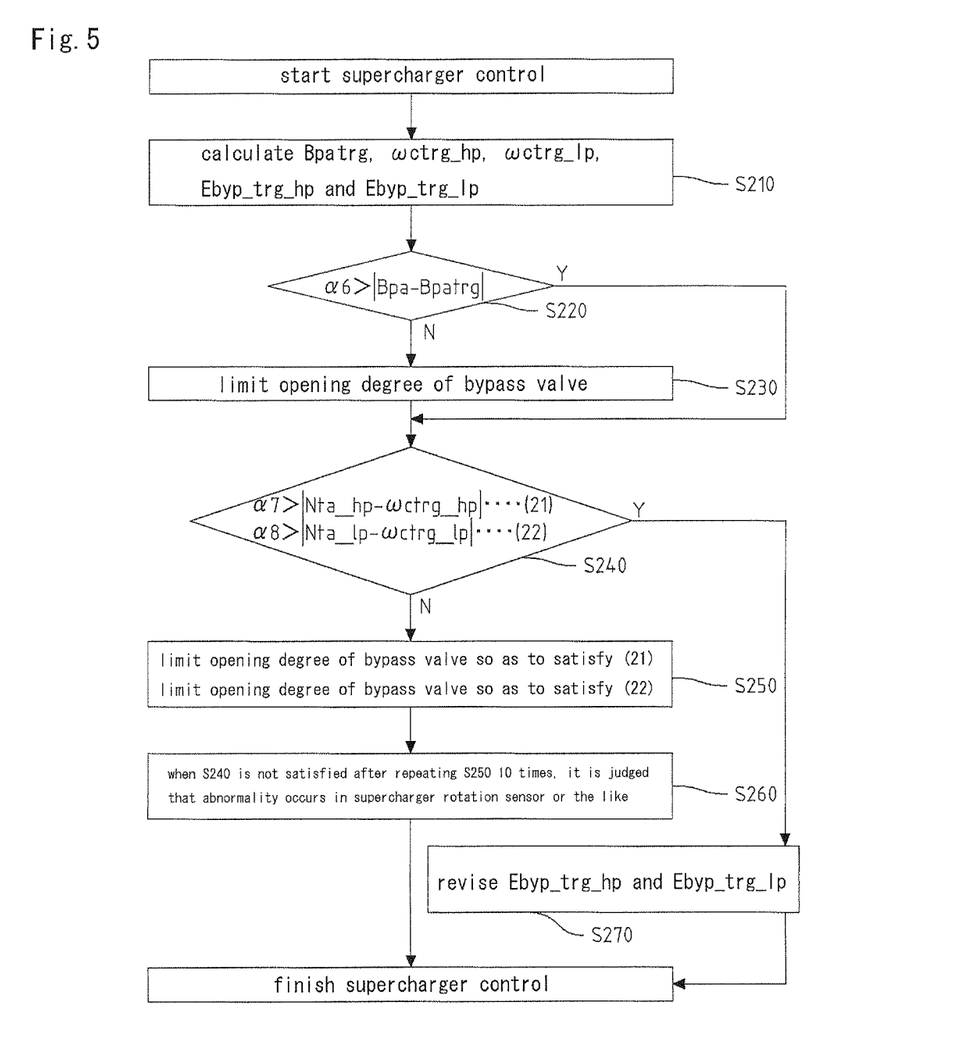
FIG. 5 is a flow chart of control construction of superchargers.

FIG. 4 is a schematic drawing of entire construction of an engine 200 having the two-stage supercharging system 20 according to a second embodiment of the present invention. FIG. 5 is a flow chart of control construction of superchargers 21 and 31.

Figure 6:
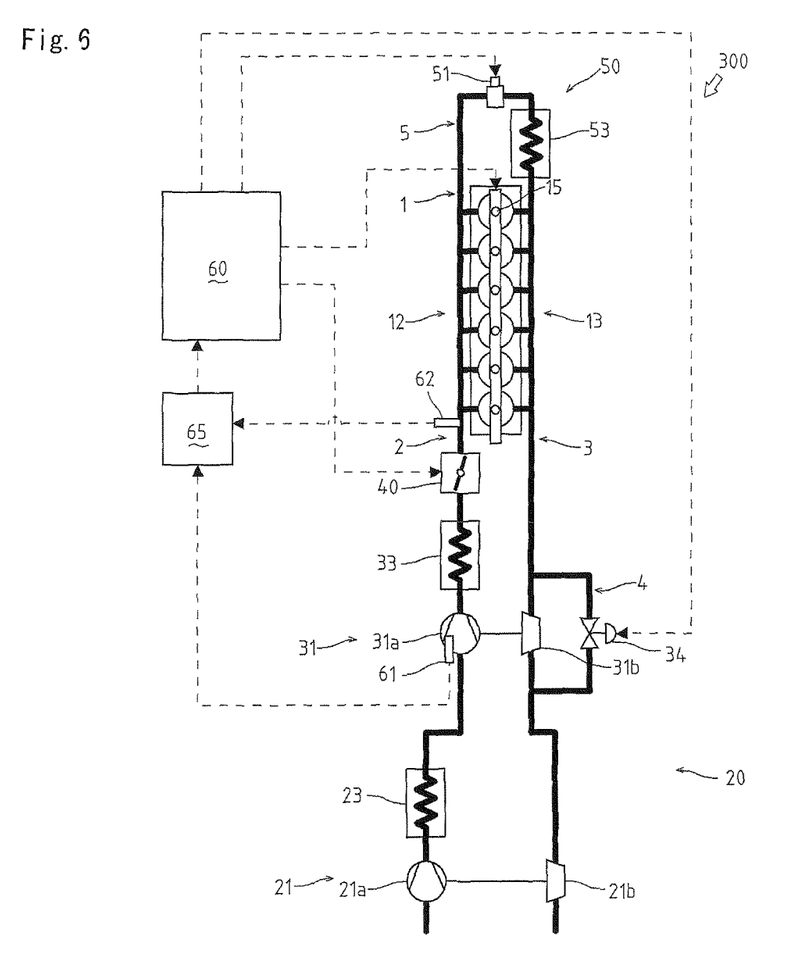
FIG. 6 is a schematic drawing of entire construction of an engine having the two-stage supercharging system according to a third embodiment of the present invention.
Figure 7:
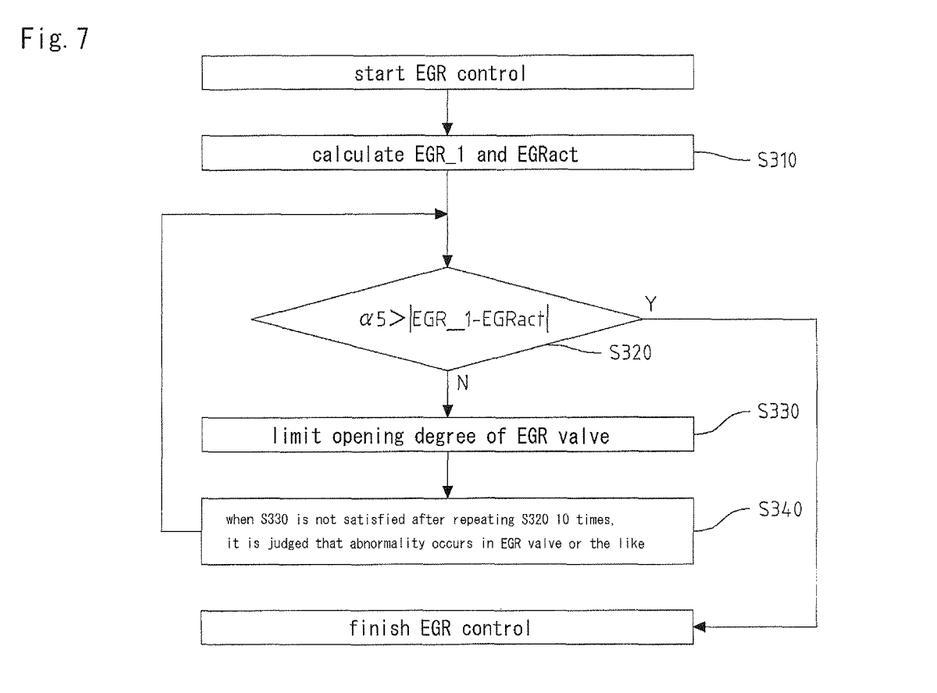
FIG. 7 is a flow chart of control construction of an EGR valve.

FIG. 6 is a schematic drawing of entire construction of an engine 300 having the two-stage supercharging system 20 according to a third embodiment of the present invention. FIG. 7 is a flow chart of control construction of an EGR valve 51.

Explanation will be given on the construction of the engine 100 which is the first embodiment of the present invention referring to FIG. 1. The engine 100 is a direct injection type 6-cylindered engine having six combustion chambers, and mainly includes an engine body 1, an intake manifold 12 to which an air intake passage 2 is connected, an exhaust manifold 13 to which an exhaust gas passage 3 is connected, and fuel injection nozzles 15 injecting fuel to the combustion chambers. The fuel injection nozzles 15 can be controlled their fuel injection timing and the like by a control signal from a control device 60.

The engine 100 has the two-stage supercharging system 20. The two-stage supercharging system 20 has two superchargers, i.e. a low-pressure supercharger 21 and a high-pressure supercharger 31.

The air intake passage 2 guides intake air through the intake manifold 12 to the engine body 1. Along the flow of the intake air, the air intake passage 2 is provided therein with a compressor 21a constituting the low-pressure supercharger 21, an intercooler 23 cooling the intake air pressurized by the compressor 21a, a compressor 31a constituting the high-pressure supercharger 31, an intercooler 33 cooling the intake air pressurized by the compressor 31a, and an intake throttle 40 limiting flow rate of the intake air flowing in the air intake passage 2.

A supercharging pressure sensor 62 is provided in the intake manifold 12, and detects pressure of the intake air guided to the engine body 1 and transmits a detection signal to the control device 60.

The exhaust gas passage 3 discharges exhaust gas from the engine body 1 through the exhaust manifold 13. Along the flow of the exhaust gas, the exhaust gas passage 3 is provided therein with a turbine 31b constituting the high-pressure supercharger 31 and a turbine 21b constituting the low-pressure supercharger 21.

In detail, the low-pressure supercharger 21 is constructed by the compressor 21a which can pressurize efficiently the intake air when the engine 100 is at the high-output driving state, and the turbine 21b rotatively drives the compressor 21a. The high-pressure supercharger 31 is constructed by the compressor 31a which can pressurize efficiently the intake air when the engine 100 is at the low-output driving state, and the turbine 31b rotatively drives the compressor 31a.

The low-pressure supercharger 21 and the high-pressure supercharger 31 pressurize the intake air flowing in the air intake passage 2 by the compressors 21a and 31a. The compressor 21a of the low-pressure supercharger 21 is arranged at the upstream side of the air intake passage 2, and the compressor 31a of the high-pressure supercharger 31 is arranged at the downstream side of the air intake passage 2.

In the engine 100 according to this embodiment, a bypass passage 4 is provided which bypasses the exhaust gas from the upstream side to the downstream side of the turbine 31b constituting the high-pressure supercharger 31, and a bypass valve 34 is provided which limits flow rate of the exhaust gas flowing in the bypass passage 4.

Furthermore, in the high-pressure supercharger 31, a supercharger rotation sensor 61 is provided with which a detection signal obtained by the rotation of the compressor 31a constituting the high-pressure supercharger 31 can be transmitted to the control device 60.

The control device 60 mainly includes a central processing unit, a storage device and the like. The control device 60 is connected electrically through an amplifier 65 to the supercharger rotation sensor 61 provided in the high-pressure supercharger 31, the supercharging pressure sensor 62 provided in the intake manifold 12, and engine output set means such as an accelerator pedal (not shown). The control device 60 prepares a control signal based on electric signals from these members and outputs the control signal to the fuel injection nozzles 15 and the like.

In the control device 60, control maps such as supercharging map, fuel injection map, intake throttle map and EGR map are stored so as to drove the engine 100 following requirement of an operator.

In each of the control maps such as the supercharging map, for securing engine rotation speed or torque required by an operator, optimum control agents previously found by experiment are stored. Accordingly, the control device 60 calls the control agents from the control maps and prepares the control signal so as to control the engine 100 optimally.

Explanation will be given on the supercharging map in detail. FIG. 2 is a graph of iso efficiency curves of compressor performance of the low-pressure supercharger 21 and the high-pressure supercharger 31. In FIG. 2, the axis of abscissas indicates flow rate of the intake air flowing to each of the compressors 21a and 31a, and the axis of ordinates indicates pressure ratio of the upstream side and the downstream side of each of the compressors 21a and 31a.

As shown in FIG. 2, in iso efficiency curves 21map of the low-pressure supercharger 21, a right end line 21mapR is regarded as a rotational limit line, and a left end line 21mapL is regarded as a surge limit line. Each of the rotational limit line and the surge limit line is a border at which pressurizing efficiency is reduced widely by instability of flow of the intake air by peeling. Namely, the low-pressure supercharger 21 can pressurize the intake air in an area surrounded by the rotational limit line and the surge limit line, and the center part of the area is regarded as a high-efficiency range at which the intake air can be pressurized most efficiently. Similarly, in the high-pressure supercharger 31, the intake air can be pressurized in an area surrounded by a rotational limit line and a surge limit line, and the center part thereof is regarded as a high-efficiency range (see iso efficiency curves 31map).

As shown in FIG. 2, the high-efficiency range of the low-pressure supercharger 21 is formed at the side of high flow rate and high pressure ratio, and the high-efficiency range of the high-pressure supercharger 31 is formed at the side of low flow rate and low pressure ratio. Accordingly, the engine 100 having the two-stage supercharging system 20 constructed by the superchargers 21 and 31 can obtain the optimum supercharging pressure in the wide operating area.

Explanation will be given on the control of the superchargers in the engine 100 referring to FIG. 3. The control device 60 calculates a target supercharging pressure Bpatrg, a target supercharger rotational speed ωctrg and a target bypass valve opening Ebyp_trg (S110).

The target supercharging pressure Bpatrg is a supercharging pressure for optimizing fuel combustion corresponding to the driving state of the engine 100 and is calculated based on the supercharging map and the like stored in the control device 60.

The target supercharger rotational speed ωctrg is a rotational speed of the compressor 31a for optimizing pressurization of the intake air in the high-pressure supercharger 31 and is calculated based on the target supercharging pressure Bpatrg and the supercharging map (see FIG. 3) and the like stored in the control device 60.

The target bypass valve opening degree Ebyp_trg is an opening degree of the bypass valve 34 for setting the rotational speed of the compressor 31a constituting the high-pressure supercharger 31 be the target supercharger rotational speed ωctrg and is calculated based on the supercharging map and the like stored in the control device 60.

The control device 60 judges whether the absolute value of the remainder between an actual supercharging pressure Bpa and the target supercharging pressure Bpatrg is smaller than a predetermined value α2 or not as a condition (11) and judges whether the absolute value of the remainder between an actual supercharger rotational speed Nta and the target supercharger rotational speed ωctrg is smaller than a predetermined value α3 or not as a condition (12) (S120).

When the conditions (11) and (12) are satisfied at 5120, it is judged that the two-stage supercharging system 20 performs the supercharging corresponding to the operating state of the engine 100 and the high-pressure supercharger 31 constituting the two-stage supercharging system 20 is operated in the high-efficiency range. In this case, by selecting the compressor 21a operated in the high-efficiency range in the low-pressure supercharger 21, each of the superchargers 21 and 31 can be operated in the high-efficiency range.

The control device 60 can deal with secular degradation of the engine 100 by revising the target bypass valve opening degree Ebyp_trg (S130).

On the other hand, when the conditions (11) and (12) are not satisfied at S120, it is judged that the two-stage supercharging system 20 does not perform the supercharging corresponding to the operating state of the engine 100. Namely, it is judged that the supercharging pressure is not the optimum value corresponding to the operating state of the engine 100, or that the high-pressure supercharger 31 is not operated in the high-efficiency range. Therefore, the control device 60 limits the opening degree of the intake throttle 40 so as to satisfy the condition (11) (S140), and then limits the opening degree of the bypass valve 34 so as to satisfy the condition (12) (S150).

Furthermore, when the condition (12) is not satisfied after repeating the predetermined control at S150 10 times, the control device 60 judges that abnormality occurs in the supercharger rotation sensor 61 or the like so as to improve the reliability of the two-stage supercharging system 20 (S160).

Accordingly, in the engine 100 according to this embodiment, the flow rate of the exhaust gas flowing in the bypass passage 4 can be limited based on the supercharger rotational speed Nta of the high-pressure supercharger 31. Therefore, in the engine 100, the target supercharging pressure Bpatrg corresponding to the operating state of the engine 100 can be secured and each of the low-pressure supercharger 21 and the high-pressure supercharger 31 can be operated in the high-efficiency range, whereby the fuel consumption can be reduced.

By preparing the control signal from the rotational speed of the compressor 31a constituting the high-pressure supercharger 31 and transmitting it to the fuel injection nozzles 15, the control device 60 can change suitably the fuel injection characteristic even if the engine 100 is in the transient operating state for example. Accordingly, the optimum fuel injection corresponding to the operating state of the engine 100 can be realized so as to prevent the exhaust emission from being worsened, and the output of the engine 100 can be controlled accurately.

Next, explanation will be given on the construction of the engine 200 which is the second embodiment of the present invention referring to FIG. 4. The engine 200 according to this embodiment is similar to the engine 100 according to the first embodiment in the basic construction, but is provided additionally therein with a bypass passage 7 which bypasses the exhaust gas from the upstream side to the downstream side of the turbine 21b constituting the low-pressure supercharger 21, and a bypass valve 24 which limits flow rate of the exhaust gas flowing in the bypass passage 7.

Explanation will be given on the control of the superchargers in the engine 200 referring to FIG. 5. The control device 60 calculates the target supercharging pressure Bpatrg, a target supercharger rotational speed ωctrg_hp of the high-pressure supercharger 31, a target supercharger rotational speed ωctrg_lp of the low-pressure supercharger, a target bypass valve opening Ebyp_trg_hp of the high-pressure supercharger 31, and a target bypass valve opening Ebyp_trg_lp of the low-pressure supercharger (S210). The calculation of each target value is similar to that of the first embodiment, and explanation thereof is omitted.

The control device 60 judges whether the absolute value of the remainder between the supercharging pressure Bpa and the target supercharging pressure Bpatrg is smaller than a predetermined value α6 or not (S220). When the condition at S220 is satisfied, it is judged that the two-stage supercharging system 20 performs the supercharging corresponding to the operating state of the engine 200.

On the other hand, when the condition at 5220 is not satisfied, it is judged that the two-stage supercharging system 20 does not perform the supercharging corresponding to the operating state of the engine 200. Then, the control device 60 limits the opening degree of one or each of the bypass valve 24 of the low-pressure supercharger 21 and the bypass valve 34 of the high-pressure supercharger 31 so as to satisfy the condition at S220 (S230).

The control device 60 judges whether the absolute value of the remainder between an actual high-pressure supercharger rotational speed Nta_hp and the target supercharger rotational speed ωctrg_hp of the high-pressure supercharger 31 is smaller than a predetermined value α7 or not as a condition (21) and judges whether the absolute value of the remainder between an actual low-pressure supercharger rotational speed Nta_lp and the target supercharger rotational speed ωctrg_lp of the low-pressure supercharger 21 is smaller than a predetermined value α8 or not as a condition (22) (S240).

When the conditions (21) and (22) at 5240 are satisfied, it is judged that each of the low-pressure supercharger 21 and the high-pressure supercharger 31 constituting the two-stage supercharging system 20 are operated in the high-efficiency range. The control device 60 can deal with secular degradation of the engine 200 by revising the target bypass valve opening Ebyp_trg_lp of the low-pressure supercharger 21 and the target bypass valve opening Ebyp_trg_hp of the high-pressure supercharger 31 (S270).

On the other hand, when the conditions (21) and (22) are not satisfied at S240, it is judged that the low-pressure supercharger 21 constituting the two-stage supercharging system 20 is not operated in the high-efficiency range or that the high-pressure supercharger 31 constituting the two-stage supercharging system 20 is not operated in the high-efficiency range. The control device 60 limits the opening degree of the bypass valve 34 of the high-pressure supercharger 31 so as to satisfy the condition (21), and limits the opening degree of the bypass valve 24 of the low-pressure supercharger 21 so as to satisfy the condition (22) (S250).

Furthermore, when the conditions (21) and (22) are not satisfied after repeating the predetermined control at S250 10 times, the control device 60 judges that abnormality occurs in the supercharger rotation sensor 61 or the like so as to improve the reliability of the two-stage supercharging system 20 (S260).

Accordingly, in the engine 200 according to this embodiment, the flow rate of the exhaust gas flowing in the bypass passage 7 can be limited based on the supercharger rotational speed Nta_lp of the low-pressure supercharger 21, and the flow rate of the exhaust gas flowing in the bypass passage 4 can be limited based on the supercharger rotational speed Nta_hp of the high-pressure supercharger 31. Therefore, the target supercharging pressure Bpatrg corresponding to the operating state of the engine 200 can be secured and each of the low-pressure supercharger 21 and the high-pressure supercharger 31 can be operated in the high-efficiency range, whereby the fuel consumption can be reduced.

By preparing the control signal from the rotational speed of one or each of the compressors 21a and 31a constituting the superchargers 21 and 31 and transmitting it to the fuel injection nozzles 15, the control device 60 can change suitably the fuel injection characteristic even if the engine 200 is in the transient operating state for example. Accordingly, the optimum fuel injection corresponding to the operating state of the engine 200 can be realized so as to prevent the exhaust emission from being worsened, and the output of the engine 200 can be controlled accurately.

Next, explanation will be given on the construction of the engine 300 which is the third embodiment of the present invention referring to FIG. 6. The engine 300 according to this embodiment is similar to the engine 100 according to the first embodiment in the basic construction, but is provided additionally therein with an EGR device 50 which guides a part of the exhaust gas flowing in the exhaust gas passage 3 to the air intake passage 2.

The EGR device 50 is constructed by an EGR passage 5 guiding a part of the exhaust gas flowing in the exhaust gas passage 3 to the air intake passage 2, an EGR cooler 53 cooling the exhaust gas flowing in the EGR passage 5, and the EGR valve 51 limiting the flow rate of the exhaust gas flowing in the EGR passage 5.

Explanation will be given on EGR control of the engine 300 referring to FIG. 7. The control device 60 can calculate the flow rate of the intake air from the actual supercharging pressure Bpa and the supercharger rotational speed Nta_hp of the high-pressure supercharger 31 with an existing formula.

Firstly, the control device 60 calculates a target EGR rate EGR_1 and an EGR rate EGRact (S310).

The target EGR rate EGR_1 optimizes fuel consumption corresponding to the operating state of the engine 300 and is calculated with the EGR map and the like stored in the control device 60.

The EGR rate EGRact is calculated from an exhaust flow rate Qair_wot and an EGR flow rate Qair_act. The exhaust flow rate Qair_wot is the full flow rate of the exhaust gas flowing in the exhaust gas passage 3 when the EGR valve 51 is fully closed. The EGR flow rate Qair_act is the flow rate of the exhaust gas guided to air intake passage 2. The EGR flow rate Qair_act is calculated by revising the density based on the supercharging pressure Bpa, the supercharger rotational speed Nta_hp of the high-pressure supercharger 31, the temperature of the exhaust gas flowing in the EGR passage 5 and the like.

The control device 60 judges whether the absolute value of the remainder between the EGR rate EGRact and the target EGR rate EGR_1 is smaller than a predetermined value α5 or not (S320). When the condition at S320 is satisfied, it is judged that the EGR device 50 performs the EGR control corresponding to the operating state of the engine 300.

On the other hand, when the condition at S320 is not satisfied, it is judged that the EGR device 50 does not perform the EGR control corresponding to the operating state of the engine 300. Then, the control device 60 limits the opening degree of the EGR valve 51 of the EGR passage 5 so as to satisfy the condition at S320 (S330).

Furthermore, when the condition at S320 is not satisfied after repeating the predetermined control at S330 10 times, the control device 60 judges that abnormality occurs in the EGR valve 51 or the like so as to improve the reliability of the EGR device 50 (S340).

Accordingly, in the engine 300 according to this embodiment, the flow rate of the exhaust gas flowing in the EGR passage 5 can be limited based on the supercharging pressure Bpa and the supercharger rotational speed Nta. Therefore, the target EGR rate EGR_1 corresponding to the operating state of the engine 300 can be realized, whereby the exhaust emission can be prevented from being worsened.

INDUSTRIAL APPLICABILITY

The present invention can be employed in an engine having a plurality of superchargers.

The invention claimed is:
1. An engine comprising:
an exhaust passage;
an intake passage;

a controller comprising:
  a central unit, and
  a storage unit; and
a plurality of superchargers, each of the superchargers comprising:
a turbine rotatively driven by receiving exhaust gas flowing in the exhaust passage; and
a compressor rotatively driven by the turbine and pressurizing intake air flowing in the intake passage,
wherein the turbines of the plurality of superchargers are arranged in the exhaust passage in series,
wherein the compressors of the plurality of superchargers are arranged in the intake passage in series,
wherein at least one of the superchargers comprises:
  a supercharger rotation sensor configured to transmit a detection signal obtained from rotation of the corresponding compressor to the controller;
  a bypass passage for bypassing the exhaust gas from the corresponding turbine; and
  a bypass valve limiting the flow rate of the exhaust gas flowing in the bypass passage,
wherein the controller is configured to execute programming stored in the storage unit to prepare a control signal based on the detection signal from the supercharger rotation sensor and transmit the control signal to the bypass valve so as to limit the rotational speed of each of the compressors so the absolute value of the remainder between an actual supercharger rotational speed of each of the superchargers and a target supercharger rotational speed of each of the superchargers is less than a predetermined value.

2. The engine according to claim 1, further comprising:
a fuel injection nozzle whose fuel injection characteristic can be changed by a control signal,
wherein the controller is configured to execute programming stored in the storage unit to prepare a control signal based on the detection signal from the supercharger rotation sensor and is configured to transmit the control signal to the fuel injection nozzle so as to change the fuel injection characteristic corresponding to an operating state.

3. The engine according to claim 1, further comprising:
a supercharging pressure sensor configured to detect the pressure of the intake air pressurized by the plurality of the superchargers and transmit a detection signal to the controller; and
an intake throttle arranged at the upstream side of the supercharging pressure sensor and limiting the flow rate of the intake air pressurized by the plurality of the superchargers,
wherein the controller is configured to execute programming stored in the storage unit to prepare a control signal based on the detection signals from the supercharging pressure sensor and the supercharger rotation sensor and transmit the control signal to the intake throttle so as to limit the pressure of the intake air corresponding to an operating state.

4. The engine according to claim 3, further comprising:
an EGR passage guiding a part of exhaust gas flowing in the exhaust gas passage to the intake passage; and
an EGR valve limiting the flow rate of the exhaust gas flowing in the EGR passage,
wherein the controller is configured to execute programming stored in the storage unit to prepare a control signal based on the detection signals from the supercharging pressure sensor and the supercharger rotation sensor and transmit the control signal to the EGR valve so as to limit the flow rate of the exhaust gas guided to the intake passage corresponding to the operating state.

* * * * *

UNITED STATES PATENT AND TRADEMARK OFFICE
CERTIFICATE OF CORRECTION

PATENT NO. : 8,646,270 B2  
APPLICATION NO. : 13/059209  
DATED : February 11, 2014  
INVENTOR(S) : Takahashi et al.

Page 1 of 1

It is certified that error appears in the above-identified patent and that said Letters Patent is hereby corrected as shown below:

In the Claims

Claim 1 at Column 9, Line 2, "a central unit" should read --a central processing unit--.

Signed and Sealed this
Twenty-second Day of July, 2014

Michelle K. Lee
*Deputy Director of the United States Patent and Trademark Office*